Nov. 26, 1968  R. C. WILLIAMS ET AL  3,412,470
EDUCATIONAL DEVICE
Filed Nov. 30, 1966
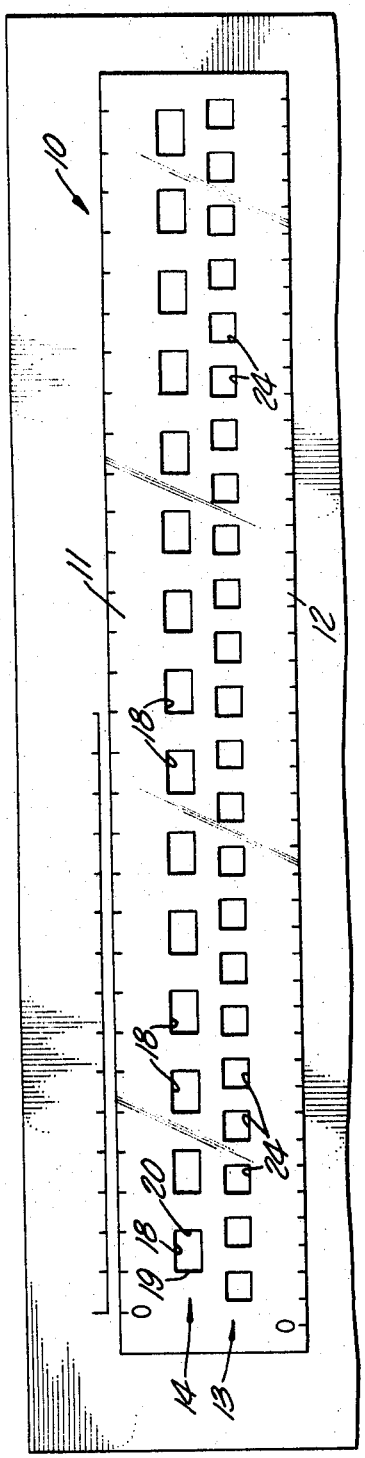
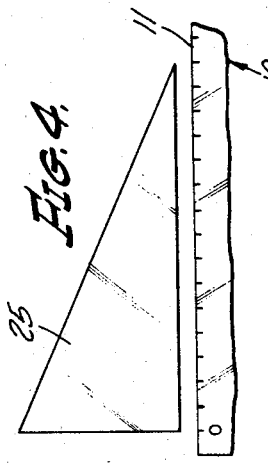
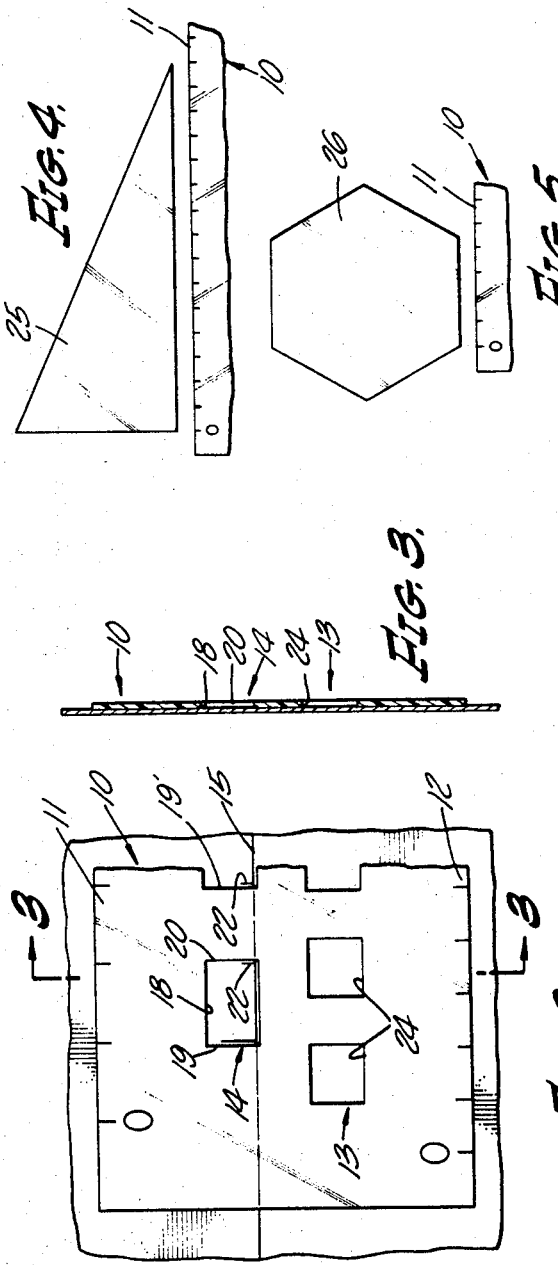
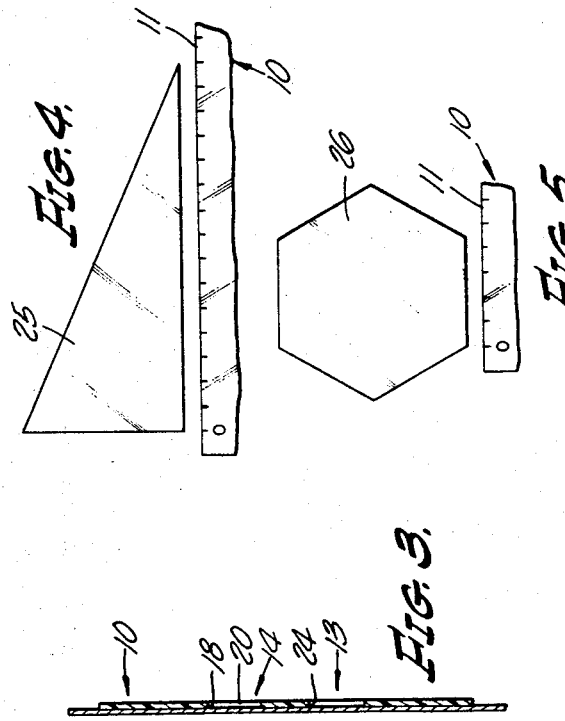
RALPH C. WILLIAMS
BENJAMIN A. PETERS
INVENTORS.
BY 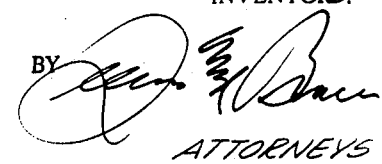
ATTORNEYS

United States Patent Office 3,412,470
Patented Nov. 26, 1968

3,412,470
EDUCATIONAL DEVICE
Ralph C. Williams, La Canada, and Benjamin A. Peters, Los Angeles, Calif., assignors of one-third interest to Roland J. Macci, El Centro, Calif.
Filed Nov. 30, 1966, Ser. No. 598,116
3 Claims. (Cl. 33—174)

ABSTRACT OF THE DISCLOSURE

An educational device and scaling tool for use by students in mastering mathematical fundamentals and simple measurements. The opposite lateral edges of the strip are provided with graduated scales of different size units. One face of the strip is treated to accept erasable written indicia of any selected value and readily replaceable with other indicia values by the user. The mid-portion of the strip is provided with one or more rows of rectangular openings so sized and arranged that their parallel transverse edges serve as guides for a pencil or the like writing instrument while making graudated scales of uniform size.

---

This invention relates to educational devices and more particularly to a scaling tool particularly useful to younger students in mastering simpler mathematical fundamentals and relationships such as those relating to measurement, addition, substraction, division and the like.

It is a primary purpose of the present invention to provide a versatile tool useful by students in the elementary grades in comprehending and using mathematical concepts and relationships. In one exemplary form the device comprises an elongated flexible strip of rigid and preferably transparent material having scales of different units along its opposite edges. The device also features a frosted surface on one face as well as one or more rows of openings which may be employed in a variety of ways by both the instructor and the student which psychological studies have demonstrated to facilitate and expedite mastery of mathematical principles and relationships. The absence of assigned values for the scaling units encourages the beginner to experiment and to make discoveries for himself. These discoveries are found to engender confidence in the student, to stimulate the learning process and to couple mental and visual impressions of significant fundamentals.

The present invention utilizes the foregoing and related principles in an extremely simple and inexpensive device having rows of cutouts or openings so spaced and related to one another as to enable the student to prepare his own scales for use in a great variety of ways. For example, four-sided openings can be prepared with ends so spaced from one another lengthwise of the device that the student can use them as pencil point guides in making his own scale. This scale can then be utilized in comparing distances and dimensions of various objects as well as in performing a wide variety of mathematical operations.

These and other more specific objects will appear upon reading the following specification and claims and upon considering in connection therewith the attached drawing to which they relate.

Referring now to the drawing in which is preferred embodiment of the invention is illustrated.

FIGURE 1 is a top plan view of a preferred embodiment of the invention educational device shown against a sheet of paper with one edge of the device lying closely parallel to a scaled line on the sheet;

FIGURE 2 is a fragmentary view on an enlarged scale showing the invention device in use to apply graduation marks to a line drawn on a sheet of paper;

FIGURE 3 is a cross-sectional view taken along line 3—3 on FIGURE 2; and

FIGURES 4 and 5 are views showing one of the devices in use to determine the number of units of length in a side of different geometric figures.

Referring initially more particularly to FIGURE 1 there is shown one preferred embodiment of the invention educational device designated generally 10. This device is preferably blanked from flexible but rigid thermoplastic material such as methacrylate or the like. Desirably the material is transparent in order that written or lined material may be readily read through the body of the device. A strip approximately 12 inches long and one and one-half inches wide is quite suitable.

Distributed along either of the parallel lateral edges are separate scales 11 and 12 each comprising equally spaced graduation marks desirably without numbers or units of any kind. The initial mark of each scale may be appropriately designated as by a zero. Desirably one face of the strip is frosted sufficiently to be easily marked with a lead pencil. Accordingly, the student can assign his own values to the graduation marks. For example, scale 11 can be marked with values of desired nature such as fractions of an inch, inches, feet, yards, miles and the like. The same is equally true of scale 12, it merely being necessary for the student to apply appropriate numerals opposite each or selected ones of the graduation marks.

Arranged in one or more rows longitudinally of the central portion of the device are cutouts of any desired pattern useful in preparing still other scales or devices for aiding the learning process, stimulating experimentation and in arousing the student's interest. By way of example, FIGURES 1 and 2 show the invention device as having two rows of cutouts 13 and 14. Cutouts 13 are essentially of square configuration whereas openings 14 are rectangular. In each case the opposite ends of the openings extending transversely of the device are parallel to one another and so positioned that the end walls can be used as guides for a pencil point in drawing lines equally spaced from one another. This is best illustrated in FIGURE 2 wherein the device is placed on a sheet of paper having a stright line 15. With respect to the rectangular opening 18, it will be noted that its opposite ends 19 and 20 are so spaced that when used as guides for a pencil point the resulting graduation lines 22 are equally spaced from one another with one end terminating on the straight line 15. This latter objective is usually accomplished by placing the longer edges of openings 18 closely parallel to line 15.

It will likewise be understood that the other row 13 of openings 24 have their opposite end walls similarly related to one another.

FIGURES 4 and 5 show scale 11 of device 10 applied alongside typical geometric figures and in use to determine the number of scale units represented in a selected side of these figures. Thus FIGURE 4 shows scale 11 applied against the lower horizontal side of triangle 25 and indicating that this side is 15 units long. A similar measurement of a side of the hexagon 26 shown in FIGURE 5 discloses that it is four and one-half units long. As will be readily appreciated from the foregoing, the invention device just disclosed can be utilized in innumerable ways to excite the student and to enhance the learning process.

While the particular educational device herein shown and disclosed in detail is fully capable of attaining the objects and providing the advantages hereinbefore stated, it is to be understood that it is merely illustrative of the presently preferred embodiments of the invention and that no limitations are intended to the details of construction or design herein shown other than as defined in the appended claims.

We claim:
1. An educational device for use by younger students in mastering fundamental concepts of measurement and mathematical relationships, said device comprising an elongated thin flexible strip having a graduated scale along either lateral edge thereof with the graduations in one scale of different size from those in the other scale, at least one face of said strip being sufficiently rough adjacent said graduations that any selected set of scale units can be marked temporarily with selected indicia and later replaced with different indicia, said strip having a row of rectangular openings extending therethrough lenghtwise of its midportion with one pair of transverse parallel edges of each rectangular openings extending crosswise of said strip, said rectangular openings having a length longitudinally of said strip slightly greater than the spacing between adjacent openings by a distance such that said transverse edges of adjacent openings are adapted for use as a guide for a writing instrument in drawing the graduations of one of said graduated scales of equal size units.

2. An educational device as defined in claim 1 characterized in the provision of a plurality of rows of said rectangular openings, each of said rows of rectangular openings being similar to said first mentioned row but differing in that each row is adapted for use in preparing a set of equal size graduations of different unit value than the unit value of the other of said rows of openings and useful in measuring straight line distances in units of different size.

3. An educational device as defined in claim 2 characterized in that the rectangular openings in one of said rows of openings are substantially square in shape and in that the rectangular openings in another of said rows are oblong in shape.

References Cited

UNITED STATES PATENTS

| | | | |
|---|---|---|---|
| 732,379 | 10/1901 | Shireman | 33—42 |
| 861,799 | 7/1907 | Breil | 33—107 |
| 1,293,313 | 2/1919 | Berkoff. | |
| 1,662,882 | 3/1928 | Clark. | |

FOREIGN PATENTS 373,675    6/1932    Great Britain.

SAMUEL S. MATTHEWS, *Primary Examiner.*